J. A. JONCAS.
VEHICLE LAMP.
APPLICATION FILED MAY 17, 1910.

1,017,000.

Patented Feb. 13, 1912.

2 SHEETS—SHEET 1.

WITNESSES

INVENTOR
JOSEPH A. JONCAS
BY Paul & Paul
ATTORNEYS

J. A. JONCAS.
VEHICLE LAMP.
APPLICATION FILED MAY 17, 1910.
1,017,000.
Patented Feb. 13, 1912.
2 SHEETS—SHEET 2.
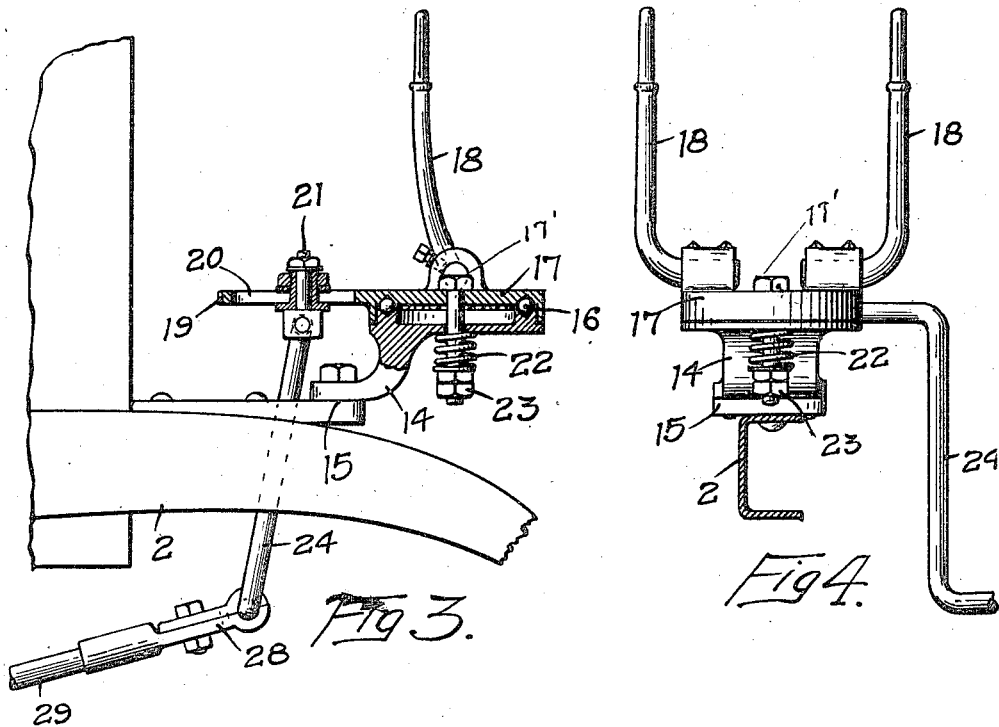
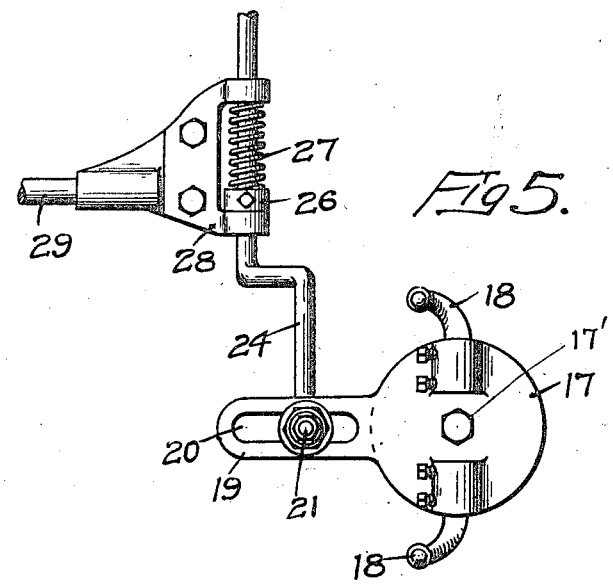
WITNESSES
INVENTOR
JOSEPH A. JONCAS
BY
ATTORNEYS

UNITED STATES PATENT OFFICE.

JOSEPH A. JONCAS, OF MINNEAPOLIS, MINNESOTA.

VEHICLE-LAMP.

1,017,000.

Specification of Letters Patent. Patented Feb. 13, 1912.

Application filed May 17, 1910. Serial No. 561,860.

*To all whom it may concern:*

Be it known that I, JOSEPH A. JONCAS, of Minneapolis, Hennepin county, Minnesota, have invented certain new and useful Improvements in Vehicle-Lamps, of which the following is a specification.

My invention has reference particularly to the lamps or head-lights for motor vehicles, the primary object being to provide means whereby the light rays from the lamp will be projected in the direction of travel of the machine, whether on a straight course or in turning corners or rounding curves.

A further and particular object is to simplify and improve the mechanism employed between the lamps and the steering mechanism, to the end that the rattling and shaking of the different parts will be eliminated.

The invention consists generally in various constructions and combinations, all as hereinafter described and particularly pointed out in the claims.

Figure 1:
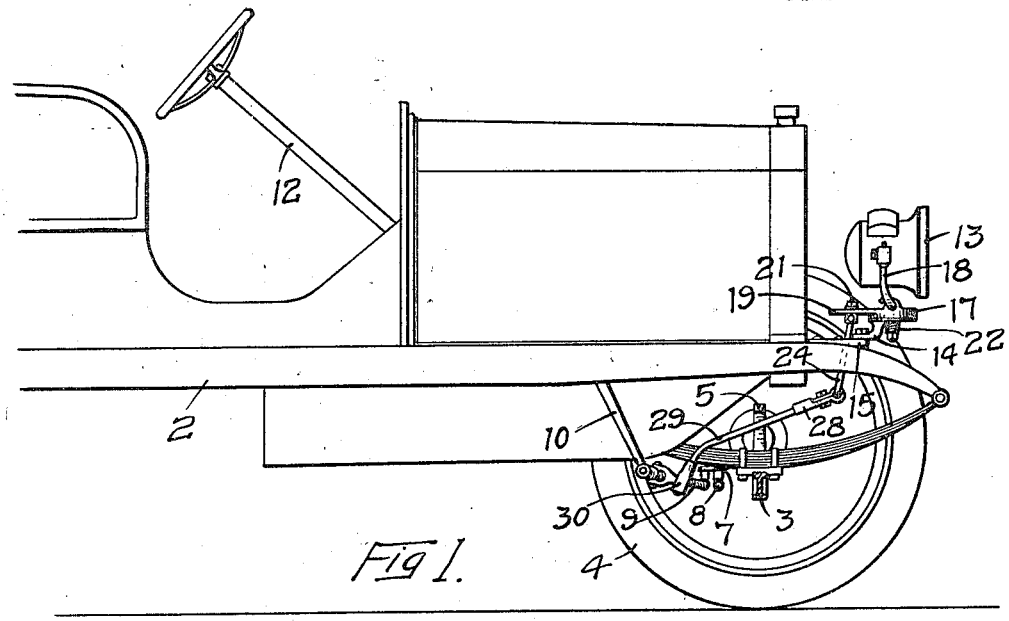
Figures 2, 6:
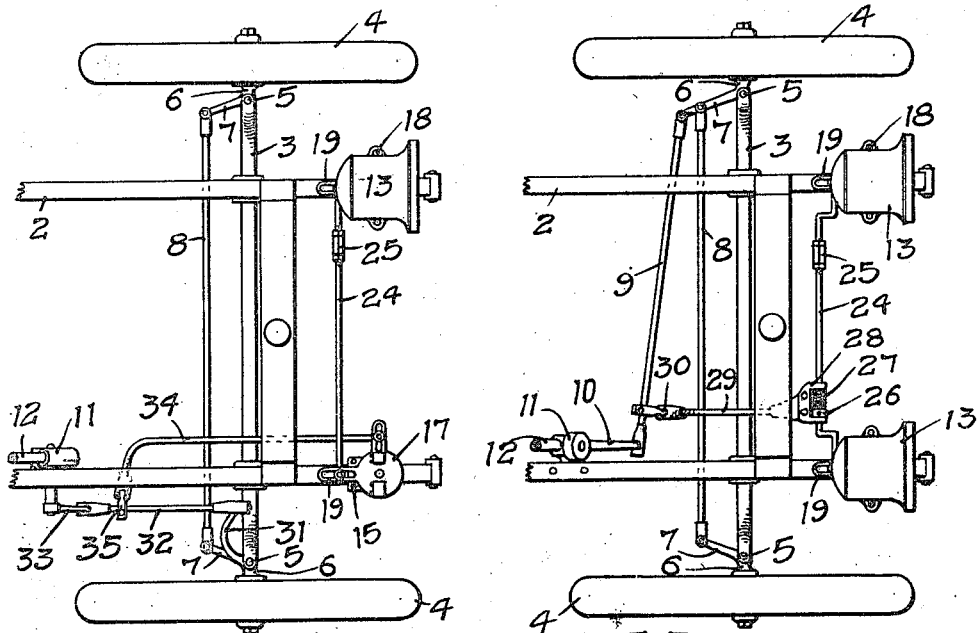

In the accompanying drawings forming part of this specification, Figure 1 is a side elevation of the forward portion of a motor vehicle, with my invention applied thereto, Fig. 2 is a plan view of the lamp operating mechanism of Fig. 1, Fig. 3 is a detail sectional view illustrating the manner of mounting the lamps and the operating mechanism therefor, Fig. 4 is a front view of the mechanism of Fig. 3, Fig. 5 is a plan view, Fig. 6 illustrates a modified construction.

In the drawing, 2 represents a motor vehicle having a forward axle 3 and wheels 4. These wheels are arranged to swing on pivots 5 in the usual way and the stub axles 6 whereon the wheels are mounted are provided with rearwardly extending arms 7 connected with one another across the machine by a rod 8. A rod 9 is attached to one of the arms 7 and extends across the machine and has a loose connection with the lower end of a steering arm 10, the upper end of which is geared at 11 to the lower end of the steering post 12. The rocking of the arm 10 will reciprocate the rod 9 and oscillate the arms 7 and the wheels in the usual way.

The lamps 13 are arranged on the front of the machine as usual, and brackets 14 are secured at 15 and have bearings 16 for plates 17 carrying standards 18 upon which the lamps are supported in the usual way. The plates 17 have rearwardly extending arms 19 provided with longitudinal slots 20 in which bolts 21 are slidable to allow for adjustment of the bolts 21 toward or from the lamps to obtain the desired range of oscillation of the lamps and also to allow the connecting rod between the bolts 21 to be moved toward or from the steering rod 9 for convenience of attachment thereto. Bolts 17′ pass downwardly through the plates 17 and the brackets 14 and carry springs 22 and lock nuts 23 by means of which the tension of the springs may be increased or decreased. A crank rod 24 extends across the machine and connects the bolts 21 with one another. This crank rod is provided with a turn buckle 25 by means of which the lamps may be oscillated until they are in alinement with one another. A collar 26 is secured on the crank rod, forming a stop for a spring 27, and a yoke 28 is adapted to slide on said rod, moving in one direction against the tension of said spring. A rod 29 connects the yoke 28 through a ball and socket joint 30 with the rod 9, so that when the rod 9 is reciprocated across the machine by the movement of the steering post the lamps will be oscillated on their bearings simultaneously with the movement of the wheels, so that the rays of light will always be thrown in the direction the machine is moving, even though it may be rounding a curve or turning a sharp corner.

I am aware that devices of this kind have heretofore been patented for the purpose of throwing the lamp rays in the direction of movement of the machine and I do not claim this arrangement broadly herein, my invention consisting in the improved mechanism employed for accomplishing this purpose.

In Fig. 6 I have illustrated a modified construction wherein an arm 31 is provided on the stub axle of the wheel spindle and connected to the steering post through a rod 32 and a crank 33. A rod 34 has a connection at 35 to the rod 32 and at its forward end is attached to the slotted arm of the lamp supporting plate.

I claim as my invention:—

1. In a motor vehicle, the combination, with a frame, of brackets mounted thereon, plates having ball bearings on said brackets, bolts passing through said plates and brackets, and having lock nuts and springs provided on said bolts between said nuts and said brackets, lamps carried by said plates, said plates having laterally extended slotted arms, a rod having its ends connected to said arms in said slots, a steering apparatus and means operatively connecting said rod with said steering apparatus.

2. The combination, with a frame, of lamps swiveled thereon, a rod connecting said lamps to operate them simultaneously, a yoke adapted to slide on said rod, a spring arranged on said rod and engaging said yoke and resisting its movement in one direction, a rod connected with said yoke, and a steering apparatus operatively connected with said rod.

3. In a motor vehicle, the combination, with the upwardly and forwardly extending brackets having flattened upper surfaces, plates having flattened under surfaces provided with anti-friction bearings on said brackets, bolts passing through said plates and brackets and having springs and lock nuts for yieldingly securing said plates and brackets together, lamp standards mounted on said plates, lamps carried by said standards, a crank rod extending transversely of the machine between said plates and attached at its ends to said plates, a steering apparatus, and means connecting said steering apparatus with said crank rod.

4. The combination, with a motor vehicle frame, of lamps having rotating bearings on said frame, a transversely arranged crank rod having its ends connected to said lamps, a steering apparatus, means interposed between said steering apparatus and said crank rod and having a pivotal connection with said steering apparatus at one end, and a yielding connection with said crank rod at its other end.

5. The combination, with a motor vehicle frame, a forward axle and wheels therefor, of lamp brackets mounted on said frame, lamps carried by said brackets, springs interposed between said axle and frame, a crank rod extending transversely of said frame and having its ends connected with said lamps, the middle portion of said crank rod depending below said frame between said springs, a steering apparatus connected with said wheels in the rear of said axle, and a rod connected at its forward end to said crank rod and extending backwardly above said axle and attached at its rear end to said steering apparatus.

6. The combination, with a motor vehicle frame, of lamp brackets mounted thereon, lamps having bearings on said brackets, a crank rod extending transversely of said frame between said lamp brackets, the middle portion of said rod depending below said brackets, a steering apparatus, a rod attached at its forward end to said crank rod and extending rearwardly therefrom and having a pivotal connection at its rear end with said steering apparatus, the ends of said crank rod being adjustable toward or from said lamps to regulate their range of oscillation and for convenience of connection between said crank rod and said steering apparatus.

In witness whereof, I have hereunto set my hand this 10th day of May, 1910.

JOSEPH A. JONCAS.

Witnesses:
 GENEVIEVE E. SORENSEN,
 J. A. BYRNES.